(12) United States Patent
Uetsuka et al.

(10) Patent No.: US 8,048,511 B2
(45) Date of Patent: Nov. 1, 2011

(54) TITANIUM OXIDE COATING AGENT AND TITANIUM OXIDE FILM FORMING METHOD

(75) Inventors: Hiroshi Uetsuka, Nagoya (JP); Tetsuya Shichi, Nagoya (JP); Koji Oshika, Ogaki (JP); Akira Fujishima, Nagoya (JP); Katsuhiko Takagi, Nagoya (JP)

(73) Assignee: Central Japan Railway Company, Nagoya-Shi (JP)

( * ) Notice: Subject to any disclaimer, the term of this patent is extended or adjusted under 35 U.S.C. 154(b) by 927 days.

(21) Appl. No.: 11/885,918

(22) PCT Filed: Sep. 9, 2005

(86) PCT No.: PCT/JP2005/016644
§ 371 (c)(1),
(2), (4) Date: Nov. 9, 2007

(87) PCT Pub. No.: WO2006/095464
PCT Pub. Date: Sep. 14, 2006

(65) Prior Publication Data
US 2008/0280103 A1 Nov. 13, 2008

(30) Foreign Application Priority Data
Mar. 9, 2005 (JP) ................................ 2005-065554

(51) Int. Cl.
*B32B 7/02* (2006.01)
(52) U.S. Cl. ........................................ 428/212; 428/148
(58) Field of Classification Search .................. 428/148, 428/212
See application file for complete search history.

(56) References Cited

U.S. PATENT DOCUMENTS

| 5,863,514 A | 1/1999 | Sasaki et al. |
| 7,354,650 B2 * | 4/2008 | Nakajima et al. ............. 428/446 |
| 2005/0227008 A1 | 10/2005 | Okada et al. |

FOREIGN PATENT DOCUMENTS

| EP | 1033347 A1 | 9/2000 |
| EP | 1424372 A1 | 6/2004 |
| EP | 1491498 A1 | 12/2004 |
| JP | 4144918 | 5/1992 |
| JP | 8-117596 A | 5/1996 |
| JP | 9025123 | 1/1997 |
| JP | 9067124 | 3/1997 |
| JP | 9225387 A | 9/1997 |
| JP | 9227122 | 9/1997 |
| JP | 9227123 | 9/1997 |
| JP | 10259023 | 9/1998 |
| JP | 11-199860 A | 7/1999 |
| JP | 2000-273355 A | 10/2000 |
| JP | 2001-70112 A | 3/2001 |
| JP | 2001-170497 A | 6/2001 |
| JP | 2001270022 | 10/2001 |
| JP | 2002265223 | 9/2002 |
| JP | 2003-93485 A | 4/2003 |
| JP | 2003321222 | 11/2003 |
| JP | 2004025568 | 1/2004 |
| JP | 2004130429 | 4/2004 |
| JP | 2004224964 | 8/2004 |
| JP | 2004238226 | 8/2004 |
| JP | 2004-244608 A | 9/2004 |
| JP | 2004-275999 A | 10/2004 |
| JP | 2005290369 | 10/2005 |
| WO | WO 03016218 | 2/2003 |
| WO | WO 03016409 | 2/2003 |
| WO | WO 03/053576 A1 | 6/2003 |
| WO | 03080244 | 10/2003 |
| WO | WO 2004/096935 A1 | 11/2004 |

OTHER PUBLICATIONS

The Jun. 23, 2010 Office Action in counterpart Chinese Application No. 200580049025.X.
The English Translation of the Jun. 23, 2010 Office Action in counterpart Chinese Application No. 200580049025.X.
Kamizuka et al., 94th CatSJ Meeting Toronkai A Yokoshu, Sep. 27, 2004, p. 118.
Ojika et al., CSJ: The Chemical Society of Japan 84th Spring Meeting Koen Yokoshu I, Mar. 11, 2004, p. 484.
Kamizuka et al., CSJ: The Chemical Society of Japan 85th Spring Meeting Koen Yokoshu I, Mar. 11, 2005, p. 37.
Matsuda et al., Preparation of Titania Nano Sheet-Precipitated Coatings on Glass Substrates by Treating SiO2-TiO2 Gel Films with Hot Water Under Vibrations, Journal of Sol-Gel Science and Technology 31, 229-233, 2004.
Supplementary European Search Report dated Sep. 29, 2009 in counterpart foreign application EP05782354.
Office Action dated Oct. 16, 2009 for corresponding Chinese application 200580049025X. Office Action issued by the Patent Office of the People's Republic of China, dated Mar. 9, 2009, in counterpart foreign Application No. 200580049025.X, filed Sep. 10, 2007.
Japanese Patent Office Notice of Reason(s) for Rejection with English translation dated Mar. 15, 2011, in counterpart foreign application No. 2005-065554.

* cited by examiner

*Primary Examiner* — Mark Rughkosky
*Assistant Examiner* — Lawrence Ferguson
(74) *Attorney, Agent, or Firm* — Kinney & Lange, P.A.

(57) ABSTRACT

This invention provides a coating agent, which can form a coating film over a wide area in a simple manner, is chemically and physically stable, and can form an ultrathin film, a coating film, a method for formation of coating film, and various products coated with the coating film. The coating agent contains thin sheet titanium oxide fine particles. The coating agent may comprise a solution containing a titania nanosheet and a sol of silicon oxide or titanium oxide. The coating film is formed by coating and then drying and heating the coating and has a microstructure in which thin sheet titanium oxide fine particles are stacked with a high level of orientation.

22 Claims, 2 Drawing Sheets

TITANIUM OXIDE COATING AGENT AND TITANIUM OXIDE FILM FORMING METHOD

TECHNICAL FIELD

This invention relates to coating agents and coating methods capable of forming photocatalytic titanium oxide film with strong adhesion, a high degree of smoothness and a high degree of hardness, on a substrate made of materials such as glass, plastics, metals, and ceramic. The present invention also relates to such coatings.

BACKGROUND ART

Figure 3:
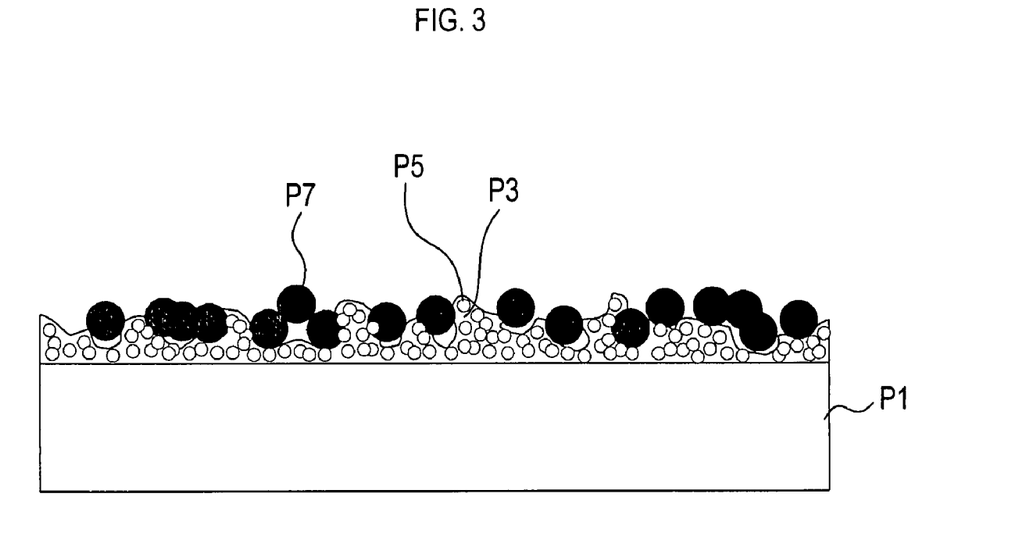
FIG. 3 is a sectional view showing the structure of a film formed by a conventional coating agent.

Photocatalytically active titanium oxide is applied in a broad range of areas because titanium oxide is a material with anti-staining/fouling, anti-bacterial and odor eliminating properties, upon radiation by sun light or ultra-violet light. Photocatlytic titanium oxide is usually made of spherical microparticles in the range of a few nm to several tens of nm. When photocatlytic titanium oxide is used for a film, as shown in FIG. 3, spherical microparticles of titanium oxide P5 are fixed on a base material P1 by using a suitable fixing agent P3 which is called a binder. In this way, photocatlytic titanium is used as a coating agent. material. The binder is selected depending on a type of the base material to be coated. Inorganic binder, such as silica or silicate, or organic binder, such as silicone resin or fluorine resin, which are resistant to the photocatalytic reaction, are used. Another method is also known wherein titanium oxide sol obtained from hydrolyzing titanium tetra alkoxide, such as $Ti(OC_3H_7)_4$, is used as a coating agent.

Titanium oxide is also used in the form of sol solution wherein sheet-like microparticles of titanium oxide (titanium oxide nanosheets) are dispersed. This sol solution can be obtained by acidifying titanate compound having a layer structure and subsequently treating the titanate compound in aqueous solution of ammonium compound or amine compound (Patent Document 1 to 5). For a coating method with the titanium oxide nanosheets, super-thin film methods wherein the super-thin film is layered by alternately immersing a base material into the solution of cationic polymer and solution of nanosheets (Patent Document 6 to 9), anatase type or rutile type titanium oxide methods wherein these types of titanium oxide is heated so as to obtain an anatase type or rutile type titanium oxide film (Patent Document 6 and 10), or a film forming method wherein layers are formed according to Langmuir-Blodgett method (BL method) (Patent Document 11) are known.

Patent Document 1: Japanese Patent No. 2671949
Patent Document 2: Japanese Patent No. 2824506
Patent Document 3: Japanese Patent No. 2968440
Patent Document 4: Japanese Patent No. 2979132
Patent Document 5: Japanese Patent No. 3232306
Patent Document 6: Japanese Patent No. 3505574
Patent Document 7: Japanese Patent No. 3513589
Patent Document 8: Unexamined Japanese Patent Publication No. 2004-130429
Patent Document 9: Unexamined Japanese Patent Publication No. 2004-25568
Patent Document 10: Unexamined Japanese Patent Publication No. 2004-238226
Patent Document 11: Unexamined Japanese Patent Publication No. 2003-321222

DISCLOSURE OF INVENTION

Problem to be Solved by the Invention

With the thin film made of spherical microparticles of titanium oxide fixed with a binder, there was a problem in that the binder had a low chemical stability and low resistance against physical impact (a low hardness) applied by dust and the like, and that forming a thin film was difficult without losing the color, texture or transparency of the base material.

Moreover, there has been a problem that a coating method with sol solution wherein titanium oxide nanosheets are dispersed is hard to apply on a large area of an industrial product because this coating method is applicable only for a base material with relatively small dimensions.

Additionally, there has been a problem that a film with spherical microparticles of titanium oxide makes a rougher surface compared to the surface of a base material, as shown in FIG. 3, due to the shape of the particles, and fouling substances P7 can more easily adhere to the surface, compared to the case wherein the base material is not coated by such particles.

Thus, conventionally, no photocatalytic thin film that fulfills all the conditions in anti-staining and anti-fouling properties, film hardness, superhydrophilic property, and ability to decompose fouling, or no photocatalytic coating agent that can form such a film existed.

The present invention is made so as to attain the above-described objects. The purpose of the invention is to provide the coating agent, which can simply form a film over a large area, is chemically and physically stable, can form a smooth film, expresses the advantageous hydrophilic property and ability to decompose fouling, and can form an ultrathin film, to provide such film, and to provide a method of forming such film. It is also the purpose of the present invention to provide glass products, metal products, ceramic products, and heat-resistant polymer products produced with such coating agent with the film and the film forming method.

Means of Solving Problem (1) The invention in claim 1 is related to a coating agent containing thin sheet microparticles of titanium oxide.

In the present invention, thin sheet microparticles of titanium oxide (titania nanosheets) are sheet-like particles formed from layered titanate that is exfoliated into single layers. The particles have thickness of less than 1 nm with a high aspect ratio. The coating agent of the present invention can be manufactured by mixing this kind of sheet-like titanium oxide with, for example, silica sol prepared by hydrolyzing tetra alkoxysilane, with titania sol obtained from hydrolyzing titanium tetra alkoxide, or with alumina sol obtained from hydrolyzing aluminum alkoxide.

Figure 1:
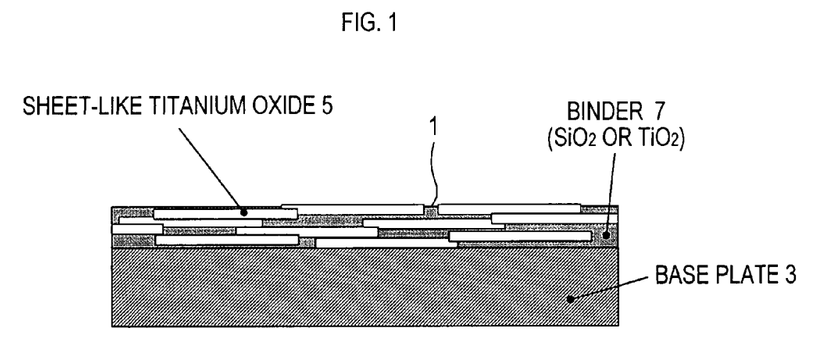
FIG. 1 is a sectional view showing the structure of a film formed by a coating agent.

As shown in FIG. 1, a film formed by applying the coating agent of the present invention has a microstructure wherein thin sheet microparticles 5 are layered in the film 1 in a uniform orientation and has high smoothness. Consequently, it is possible to form a film with high smoothness and adhesiveness to a base material. Due to high smoothness of the film, the surface area of the film becomes small, reducing the amount of contaminants adhering onto the film. However, even if contaminants adhere to the surface of the film, it is possible to decompose and remove the contaminants by the photocatalytic activity and superhydrophilic property of titanium oxide. Furthermore, hardness of the film is high.

Moreover, since a film formed by applying the coating agent of the present invention has the microstructure wherein thin sheet microparticle of titanium oxide are layered in a uniform orientation, it is possible to form an super-thin film compared to a film with the structure wherein spherical microparticles of titanium oxide are dispersed.

Furthermore, since the particles in the present invention have sheet-like (thin sheet) shape the surface area of titanium oxide per unit volume is large. Therefore, a film formed by the coating agent of the present invention has a large contact area between a base material (an object on which coating agent is applied) and titanium oxide and high adhesiveness to the base material.

Additionally, the coating agent of the present invention can easily form a film covering a large area by spin coat method or the like.

Moreover, a film formed by the coating agent of the present invention has the superhydrophilic property. When water is in contact with the surface, it is difficult to form drops. Therefore, the film is advantageous in the antifogging of the surface.

The size of the above-described thin sheet microparticles of titanium oxide is preferred to be in the range of 0.1 to 10 μm. The thickness thereof is preferred to be in the range of 0.3 to 3 nm, more preferably in the range of 0.5 to 1 nm. Additionally, aspect ratio of the thin sheet microparticles of titanium oxide is preferred to be in the range of 100 to 5000.

The ratio of the thin sheet microparticles of titanium oxide in the coating agent is preferred to be in the range of 0.025 to 10% by weight.

(2) The invention in the claim 2 is related to the coating agent as set forth in the claim 1 wherein the coating agent contains silicon oxide sol prepared from tetra alkoxysilane.

Due to the contained silicon oxide sol prepared from tetra alkoxysilane, the coating agent of the present invention can increase the adhesiveness between thin sheet microparticles of titanium oxide and a base material. Additionally, the coating agent of the present invention is advantageous in the chemical and physical stabilities compared to the coating agent wherein a resin binder is contained.

The coating agent of the present invention is different from the coating agent containing a resin binder, and capable of forming a film wherein inorganic substance is the major component (or only consists of inorganic substance) even at low temperature. Therefore, it is possible to form a hard film on resin and the like that is not resistant to heat.

In the coating agent of the present invention, the weight ratio of silicon oxide in the total weight of the coating agent is preferred to be in the range of 1 to 50% by weight. Particularly, if the weight ratio of silicon oxide is 5% by weight or more, it is possible to form a very hard film. Additionally, if the weight ratio of silicon oxide is 50% by weight or less, it is advantageous in the photocatalytic activity and the smoothness of the film.

It should be noted that due to thin sheet nanosheets, the coating agent of the present invention can form a hard film even if the silicon oxide binder is contained in a small ratio, compared to the case wherein spherical microparticles of titanium oxide are used. A conventional coating agent usually contains 50% by weight of the binder. In contrast, in the present invention, silicon oxide is used as a binder and 5% by weight in the blending quantity is enough to form a very hard film.

(3) The invention in the claim 3 is related to the coating agent as set forth in the claim 1 wherein the coating agent contains titanium oxide sol prepared from titanium tetra alkoxide.

Since the coating agent of the present invention contains titanium oxide sol prepared from titanium tetra alkoxide, the adhesiveness between thin sheet microparticles of titanium oxide and a base material can be increased. Moreover, in the present invention, the chemical and physical stabilities of the coating agent are superior to a coating agent which contains resin binder.

The coating agent of the present invention is different from the coating agents containing a resin binder in the point that a film wherein titanium oxide is the major component (or only consists of titanium oxide) can be formed even at low temperature. Therefore, it is possible to form a film on a plastic and the like which is unresistant to heat.

In the coating agent of the present invention, the weight ratio of titanium oxide sol in the total weight of the coating agent is preferred to be in the range of 1 to 90% by weight. Particularly, when the ratio is 5% by weight or more, it is advantageous in the film hardness. Moreover, when the ratio is 90% by weight or lees, it is advantageous in the smoothness on the film.

(4) The invention in the claims 4 is related to the coating agent as set forth in the claim 1 containing aluminum oxide sol prepared from aluminum alkoxide.

Since the coating agent of the present invention contains aluminum oxide sol prepared from aluminum alkoxide, the adhesiveness between the thin sheet microparticles of titanium oxide and a base material can be increased. Moreover, in the present invention, the chemical and physical stabilities of the coating agent are superior to the coating agent which contains rein binder.

In the coating agent of the present invention, the weight ratio of aluminum oxide sol in the total weight of the coating agent is preferred to be in the range of 1 to 50% by weight. Particularly, when the ratio is 5% by weight or more, it is advantageous in the film hardness. Moreover, when the ratio is 50% by weight or less, it is advantageous in the smoothness on the film.

(5) The invention in the claim 5 is related to the coating agent as set forth in any of claims 1 to 4 furthermore containing the microparticles of titanium oxide in a shape other than the thin sheet shape in addition to the microparticles of titanium oxide in a thin sheet shape.

Since the coating agent of the present invention contains the microparticles of titanium oxide in other shapes in addition to the microparticles in a thin sheet shape, it is possible to form a hard film even if the calcination temperature after coating of the coating agent is low. Furthermore, even if the blending quantity of the thin sheet microparticles of titanium oxide in the coating agent is low, photocatalytic property can be maintained.

The coating agent of the present invention can be manufactured, for example, by dispersing microparticles of titanium oxide having the shapes other than the thin sheet shape, in anatase, rutile, or brookite, in solvent, such as ethanol, and mixing the solution with a coating agent wherein thin sheet microparticles of titanium oxide (for example, titania nanosheets) are dispersed. Alternatively, the coating agent of the present invention can be also manufactured by adding microparticles of anatase, rutile and brookite and the like having the shapes other than the thin sheet shape to a coating agent wherein thin sheet microparticles of titanium oxide are dispersed.

For the shapes of microparticles other than the thin sheet shape, there are, for example, spherical, needle-like, fibriform, platy, amorphous shapes and so on.

The blending ratio of thin sheet microparticles of titanium oxide and microparticles of titanium oxide in other shapes is preferred to be in the range of 99:1 to 10:90. Particularly, the range 90:10 to 50:50 is preferable.

(6) The invention in the claim 6 is related to the coating agent as set forth in the claim 5 wherein the microparticles of titanium oxide in the shapes other than the thin sheet shape are microparticles of anatase, rutile or brookite.

Since microparticles of titanium oxide in the shapes other than the thin sheet shape are anatase, rutile or brookite, the coating agent of the present invention is advantageous in a way that a hard film can be formed even if the calcination temperature after application of the coating agent is low, and in a way that photocatalytic property can be maintained even if the blending quantity of thin sheet microparticles of titanium oxide is low.

(7) The invention in the claim 7 is related to the coating agent as set forth in any of the claims 1 to 6 wherein the roughness of the film surface formed by applying the coating agent onto a base material is in the range of 1 to 2 times the roughness of the surface of the base material.

The roughness of a film formed by applying the coating agent of the present invention is in the range of 1 to 2 times the roughness of the surface of a base material, and does not often become rough. Thus, the surface area of the film becomes small and the amount of contaminant adhered to the film becomes less.

For the index of the roughness of the surface, Ra can be used. For a measurement device to obtain Ra, AFM can be used.

(8) The invention in the claim 8 is related to the coating agent as set forth in any of the claims 1 to 7 wherein the hardness of a film formed by applying the coating agent of the present invention is determined by the nature of thin sheet particles of titanium oxide.

Since thin sheet microparticles of titanium oxide contained in the coating agent of the present invention are capable of being hardened, the hardness of a film formed by applying the coating agent is determined by the nature of thin sheet microparticles of titanium oxide. That is, even in a case wherein the coating agent of the present invention contains a binder, the film hardness does not depend upon the type of the binder (in other words, does not depend upon the fixation ability of the binder). Consequently, the coating agent of the present invention can form a film with high hardness irrespective of the type of a binder even if the coating agent contains a binder.

(9) The invention in the claim 9 is related to the coating agent as set forth in any of the claim 1 to 8 wherein the reflectivity of a film formed by applying the coating agent on a base material is in the range of 90 to 120% of the reflectivity of the base material.

A film formed by applying the coating agent of the present invention does not reduce the reflectivity of a base material. Additionally, since the film formed by applying the coating agent of the present invention has the anti-staining, anti-fouling properties and self-cleaning property, the high reflectivity can be maintained.

(10) The invention in the claim 10 is related to the coating agent as set forth in any of the claims 1 to 9 wherein the transmittance of the film formed by applying the coating agent on a transparent base material is in the range of 90 to 100% (particularly preferable in the range of 95 to 100%) of the transmittance of the base material.

The film formed by applying the coating agent of the present invention has high transmittance, and thus dose not change the color or texture of a base material. When the film is formed by applying the coating agent of the present invention on a coverglass of a solar battery or a light source, the film does not interrupt the incidence of the light due to high transmittance of the film. Consequently, it is possible to use the incident light effectively, and thus to effectively use the light energy.

If the coating agent of the present invention is applied on a light transmitting section in a light sensor or an optical communication device, due to the high transmittance of the film formed thereon, it is possible to reduce the loss in optical communication.

Furthermore, since a film formed by applying the coating agent of the present invention has the anti-staining, anti-fouling properties and self-cleaning property, high transmittance can be maintained.

(11) The invention in the claim 11 is related to a film forming method comprising steps of applying the coating agent, and drying the coating agent as set forth in any of the claims 1 to 10.

A film obtained by the present invention has high smoothness and adhesiveness to a base material, compared to the case wherein a coating agent in which only spherical microparticles of titanium oxide are dispersed is used. Therefore, the film has the anti-staining and anti-fouling properties wherein contaminants do not adhere to the film in the first place. Even when contaminants are adhered to the film, it is possible to decompose or to remove the contaminants with the aid of the photocatalytic property and the superhydrophilic property of titanium oxide.

Furthermore, since titanium oxide in the present invention is thinly spread in a sheet-like shape, the surface area of titanium oxide per unit volume is large. Consequently, the film formed in the present invention has a large contact area between a base plate and titanium oxide, and high adhesiveness to a base material.

(12) The invention in the claim 12 is related to the film forming method as set forth in the claim 11 wherein heating is conducted in the drying process.

By conducting heating in the drying process of the present invention, it is possible to shorten the time required for drying, and improve the hardness of a film to be formed.

The heating temperature is preferred to be in the range of 200 to 800° C. The heating time is preferred to be in the range of 30 seconds to 2 hours.

(13) The invention in the claim 13 is related to a titanium oxide film formed in accordance with the film forming method as set forth in the claim 11 or 12.

In the film of the present invention, titanium oxide is thinly spread in a sheet-like (thin sheet) shape, and thus the surface area of titanium oxide per unit volume is large. Consequently, the film of the present invention has a large contact area between a base material and titanium oxide and high adhesiveness to a base material.

Moreover, the film of the present invention has the superhydrophilic property. Even when water is in contact with the surface, it is difficult to form drops. Therefore, the film is advantageous in the antifogging of the surface.

(14) The invention in the claim 14 is related to the titanium oxide film as set forth in the claim 13 comprising a microstructure wherein thin sheet microparticles of titanium oxide are layered in a uniform orientation.

The film of the present invention has a micro-structure wherein thin sheet microparticles of titanium oxide are layered in a uniform orientation, and has high smoothness. Therefore, the film has the anti-staining and anti-fouling properties by which contaminants are not easily adhered to the surface. Even contaminants are adhered to the film, it is possible to decompose and remove the contaminants with the aid of the photocatalytic property and the superhydrophilic property of titanium oxide. Furthermore, the film also has the high hardness.

Because the film of the present invention has the above-described micro-structure, the thickness of the film can be super-thin, compared to the structure wherein spherical microparticles of titanium oxide are dispersed.

(15) The invention in the claim 15, is related to glass products comprising a base material made of glass and the film as set forth in the claim 13 or 14 formed on the surface of the base material.

Because of the film as set forth in the claim 13 or 14, the glass products of the present invention have high smoothness and anti-staining and anti-fouling properties. Even if contaminants are adhered to the glass product, it is possible to decompose and to remove the contaminants by the aid of the photocatalytic property and the superhydrophilic property of titanium oxide. Moreover, the adhesiveness between the film and a base material is high. Furthermore, since the film has the superhydrophilic property, even if water is in contact with the surface, it is difficult to form drops. Therefore, the glass product is advantageous in the antifogging of the surface.

For example, glass for automobiles, glass for railway vehicles, glass for building materials, optical glasses, glass for lighting equipments, glass for mirrors, showcases, glass containers for food preservation, coverglass for solar batteries and glass for tanks can be given as examples of the glass products.

(16) The invention in the claim 16 is related to metal products comprising a base material made of metal and the film as set forth in the claim 13 or 14 formed on the surface of the base material.

Due to the film as set forth in the claim 13 or 14, the metal products of the present invention have high smoothness, anti-staining and anti-fouling properties. Even if contaminants are adhered to the metal product, it is possible to decompose and remove the contaminants with the aid of the photocatalytic property and the superhydrophilic property of titanium oxide. Moreover, the adhesiveness between the film and a base material is high. Furthermore, since the film has the superhydrophilic property, even when water is in contact with the surface of the product, it is difficult to form drops. Therefore, the product is advantageous in the antifogging of the surface.

For example, gates, iron fences, uncoated walls of railway vehicles, outer surface of aircrafts, aluminum wheels, aluminum building materials, stainless building materials can be given as examples of the metal products.

(17) The invention in the claim 17 is related to ceramic products comprising a base material made of ceramic and the film as set forth in the claim 13 or 14 formed on the surface of the base material.

Due to the film as set forth in the claim 13 or 14, the ceramic products of the present invention have high smoothness, anti staining and anti-fouling properties. Even if contaminants are adhered to the ceramic product, it is possible to decompose and to remove the contaminants with the aid of the photocatalytic property and the superhydrophilic property of titanium oxide. Moreover, the adhesiveness between the film and a base material is high. Furthermore, since the film has the superhydrophilic property, even when water is in contact with the surface, it is difficult to form drops. Therefore, the ceramic product is advantageous in the antifogging property of the surface.

For example, insulators, tiles, the dishes, sanitary goods, roof tiles can be given as examples of the ceramic products.

As for ceramic, semiconductor, for example, can be given. Examples of a base material made of semiconductors can be, for example, silicon and germanium which are intrinsic semi-conductors, P-type and N-type semiconductors wherein impurities are mixed therein. Lasers, temperature sensors, and light sensors can be given as examples of the semiconductor products.

Carbon material, for example, can be given as an example of the ceramic. Examples of a base material made of a carbon material are, for example, carbon fiber, graphite, diamond and the like. Examples of carbon material products are, for example, activated carbon, radio wave absorbing panels, carbon fiber sheets for reinforcing concrete, heat resistant window materials, radiating boards, electrodes and the like.

Nitride, for example, can be another example of the ceramic. Examples of a base material made of nitride are, for example, aluminum nitride, silicon nitride, titanium nitride, boron nitride and the like. Examples of nitride products are, for example, heat resistant coatings, lasers, automobile engines, cutting tools and the like.

Carbide, for example, can be some other example of the ceramic. Examples of a base material made of carbide are, for example, silicon carbide, titanium carbide, tungsten carbide, boron carbide, zirconium carbide and the like. Examples of carbide products are, for example, heat resistant coatings, molds, cutting tools, thermal materials, neutron absorbing materials.

(18) The invention in the claim 18 is related to a heat resistant polymer products (heat resistant plastic products) comprising a base material made of a heat resistant polymer material and the film as set forth in the claim 13 or 14 formed on the surface of the base material.

Due to the film as set forth in the claim 13 or 14, the heat resistant plastic products of the present invention have high smoothness, anti-staining and anti-fouling properties. Even if contaminants are adhered to the heat resistant plastic product, it is possible to decompose and remove the contaminants with the aid of the photocatalytic property and the superhydrophilic property of titanium oxide. Moreover, the adhesiveness between the film and a base material is high. Furthermore, since the film has the superhydrophilic property, such that when water is in contact with the surface, it is difficult to form drops. The heat resistant plastic product is advantageous in the antifogging of the surface.

As examples of the heat resistant plastic products, plastic parts for automobiles, resin parts for cooking utensils, covers for high-power motors, resin parts for insulation and the like can be given. Examples of the heat resistant polymer material composing a base material are, for example, epoxy resin, polyimide, silicon-base polymer, phenol resin.

DESCRIPTION OF NUMERALS

1 . . . film
3 . . . base plate
5 . . . sheet-like (thin sheet) titanium oxide
7 . . . binder

BEST MODE FOR CARRYING OUT THE INVENTION

The best mode for carrying out the invention will now be described, by way of example, with reference to the accompanying drawings.

First Embodiment a) First, the manufacturing method of a coating agent containing titania nanosheets (thin sheet microparticles of titanium oxide) is described.

Cesium carbonate was mixed with titanium oxide at a molar ratio of 1:5.3 and heated twice at 800° C. for 20 hours. Cesium titanate obtained was stirred in diluted hydrochloric acid, then filtered, and dried. After repeating this sequence of the processes four times, laminar titanic acid in which the cesium ion was converted into hydrogen ion was obtained. By adding hydrochloride solution of tetrabutylammonium to the titanic acid and stirring the game for 14 days, titania nanosheets are prepared.

Subsequently, 1 g of 4% by weight solution of titania nanosheet was dispersed into 2 g of ethanol so as to prepare ethanol solution of titania nanosheet which is to be referred to as Coating agent A.

Then, sol solution of silicon oxide prepared by hydrolyzing tetraethoxysilane was dispersed in the above-described Coating agent A so as to make Coating agent B. It should be noted that the concentration of silicon oxide in the sol solution of silicon oxide is 0.4% by weight, and that the mixture ratio of the sol solution of silicon oxide and Coating agent A is 1:3. With this composition, the ratio of Si and Ti in Coating agent B becomes 1:9.

In the case in which sol solution of titanium oxide is used instead of sol solution of silicon oxide, it is possible to use titanium tetraisopropoxide in place of the tetraethoxysilane. Moreover, in the case in which sol solution of aluminum oxide is used instead of sol solution of silicon oxide, it is possible to use aluminum isopropoxide in place of the tetraethoxysilane.

COMPARATIVE EXAMPLE 1

For a comparative example 1, commercially available coating agent containing spherical titanium oxide (manufactured by Nippon Soda Co., Ltd., product name: Bistrator NRC-300L) was used as Coating agent C.

b) Next, the foregoing describes a film forming method wherein the coating agents in the first embodiment are applied on a surface of a glass base plate (base material) and a film is formed.

With Coating agent A of the present embodiment 1 manufactured in accordance with the above-described a), coating was conducted on a glass plate by the spin coat method. After sufficiently drying the coating film, the film was heated at 400° C. by a heat gun for one minute so as to be fixed on the glass plate. Formation of the film was confirmed by absorption spectrum measured by the ultraviolet-visible spectrophotometer and by the visual observation. After a few cycles of spin coating, drying and heating, a transparent thin film with larger thickness was formed. In the same way, other films were formed on glass plates by using Coating agent B and Coating agent C of the comparative example 1.

By the above-described application, a glass product was manufactured having a film on the surface of a base material which is made of glass. It should be noted that metallic base plate or ceramic base plate can be alternatively used in place of a glass base plate. When a metallic base plate is used, a metallic product is manufactured having a film on the surface of the base material which is made of metal. When a ceramic base plate is used, a ceramic product is manufactured having a film on the surface of the base material which is made of ceramic.

c) The following describes the effect that can be attained by the coating agents, films, and the film forming method of the present embodiment 1.

i) Coating agents A and B of the present embodiment can easily form a film covering a large area by the spin coat method and the like.

ii) Coating agents A and B of the present embodiment are advantageous in chemical and physical stabilities as the coating agents do not need to contain a resin binder.

iii) As shown in FIG. 1, the film 1 formed with Coating agent B of the present embodiment 1 has an micro-structure wherein thin sheet microparticles of titanium oxide 5 are layered in a uniform orientation in a binder 7, thus has high smoothness. Consequently, it is possible to make a super-thin film.

iv) Films formed by Coating agents A and B of the present embodiment 1 have high smoothness. Thus, contaminates are not easily adhered thereon. In other words, Coating agent A and B have high anti-staining and anti-fouling properties.

v) Films formed by Coating agents A and B have antibacterial property since the film can decompose and remove contaminants adhered thereon due to the photocatalytic activity attained by Coating agents A and B containing titanium oxide therein. Therefore, a film formed in accordance with the present embodiment 1 has self-cleaning property. Additionally, since the film has superhydrophilic property, the self-cleaning property of the film is even higher.

vi) Films formed by Coating agents A and B of the present embodiment 1 have superhydrophilic property. Thus, even when water is in contact with the surface of the films, it is difficult to form drops. Consequently, the films are advantageous in the antifogging of the surface.

vii) In films formed by Coating agents A and B of the present embodiment 1, the shape of titanium oxide is thin sheet. This shape makes the contact area between titanium oxide and a base material large, and the adhesiveness between the film the base material high. As a result, the adhesiveness between the film and the base material becomes high, and the hardness of the film becomes high.

viii) Coating agent B of the present embodiment 1 contains titanium oxide sol as a binder. Therefore, it is possible to form a film under low temperature and form a film on resin or the like which is unresistant to heat.

d) The following describes an experiment which was conducted so as to confirm the effect of the coating agents, film and the film forming method of the present embodiment 1.

Specifically, first, in order to form a film which can be confirmed by the visual observation, coating with the coating agents was repeatedly conducted 5 times on a glass base plate, in the same manner as described above in (b), by the spin coat method. Secondly, the film was heated and calcined for one minute by a heat gun at 400° C. Sample with hardened titanium oxide film was then obtained. The following experiment was conducted with this sample.

(i) Evaluation for Anti-staining, Anti-fouling Properties and Self-cleaning Property The anti-staining and anti-fouling properties of the film were confirmed by application of methylene blue (MB). 0.01 M aqueous solution of methylene blue trihydrate was prepared and applied on a film which was formed by Coating agent B of the present embodiment 1 by the spin coat method.

The aqueous solution of MB was also applied in the same manner on a film which was formed with Coating agent C of the comparative example 1.

Subsequently, with the ultraviolet-visible spectrophotometer, the amount of MB adhered on the films was measured. The measurement was conducted respectively before and after the application of the aqueous solution of MB, and after 10 minutes exposure to the ultrahigh pressure mercury lamp. The result is shown in FIG. 2.

Figure 2:
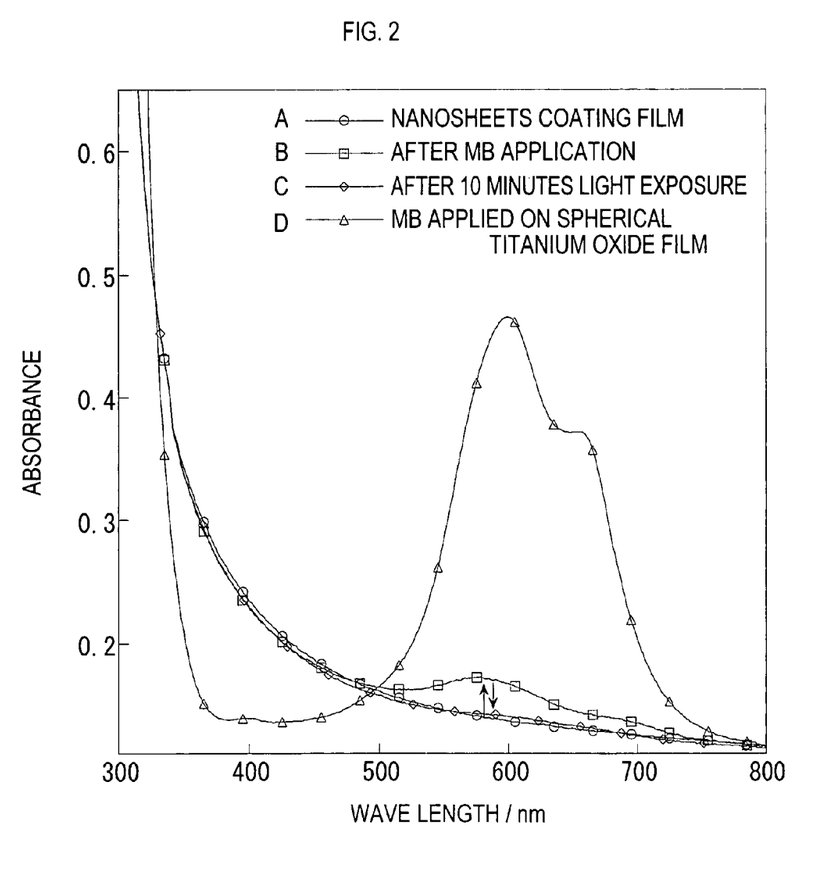
FIG. 2 is a graph showing the test result related to the anti-staining, anti-fouling properties and self-cleaning property.

In FIG. 2, the plot A shows measured values of the film formed by Coating agent B of the embodiment 1 before the application of the aqueous solution of MB on the film.

The plot B shows measured values of the film formed by Coating agent B immediately after the application of the aqueous solution of MB.

The plot C shows measured values of the film formed by Coating agent B of the embodiment 1 after the application of the aqueous solution of MB and the 10 minutes exposure to the ultrahigh pressure mercury lamp.

The plot D shows measured values of the film formed by Coating agent C of the comparative example 1 immediately after the application of the aqueous solution of MB.

As shown in FIG. 2, as compared to the plot D, the peak of the plot B which is the absorption of MB seen around 600 nm, is much smaller. That is, on the film formed by Coating agent B of the present embodiment 1, the amount of MB adhered thereto is much smaller than the amount of MB adhered to the film formed by Coating agent C of the comparative example 1. As a result, it was confirmed that the anti-staining and anti-fouling properties of the film formed by Coating agent B were high.

Moreover, in FIG. 2, the plot C is approximately the same as the plot A. In other words, on the film formed by Coating agent B of the present embodiment 1, the amount of MB adhered thereon decreased to an almost undetectable amount after the 10 minutes light exposure. Accordingly, it was confirmed that the film formed by Coating agent B of the present embodiment 1 had high photocatalytic activity, and was advantageous in the self-cleaning property.

(ii) Evaluation for Film Hardness

In accordance with the pencil scratch test as set forth in JIS K 5400, the film hardness was evaluated. Specifically, first, a coating agent was repeatedly applied on a glass base plate 5 times, in the same manner as in the above-described (b), by the spin coat method so as to form a film which could be confirmed by the visual observation. Subsequently, the film was heated up to approximately 400° C. and calcined by a heat gun. Accordingly, a sample with fixed titanium oxide film was obtained. Film hardness was evaluated immediately after the coating and after the firing under the load of 750 g by the pencil scratch test machine.

For the coating agents used in this test, Coating agent A and Coating agent B both prepared in the present embodiment 1 were used.

The film formed by Coating agent B after firing became a hard film with the hardness of 5H to 7H. On the other hand, the film formed by Coating agent B without firing or the film formed by Coating agent A respectively turned out to be soft films with the hardness of 6B.

The same test was also conducted in regard to another coating agent prepared in the same manner as Coating agent B in the basic manufacturing method but the ratio of Si/Ti was altered by changing the mixture ratio of the sol solution of the silicon oxide and Coating agent A. The result showed the tendency for the hardness to increase as the ratio of Si/Ti become larger.

(iii) Evaluation for the Superhydrophilic Property of Film

The superhydrophilic property of the film formed by Coating agent B of the present embodiment 1 was evaluated with a contact angle meter.

1 μL of water drops were applied on the film before the light exposure, and the contact angle thereof was measured. Additionally, immediately after the 10 minutes exposure to the ultraviolet rays around 310 nm, 1 μL of water drops were applied on the film, and the contact angle thereof was also measured. Subsequently, the film was left in a dark place, and the contact angles after 2, 4, 6, and 24 hours were also respectively measured.

The contact angle was 58.0° before the light exposure, but became 3.0° after the light exposure indicating the superhydrophilic property of the surface. The contact angle became larger, such as 16.0° after leaving the film in a dark place for 2 hours, 15.8° after 4 hours, 21.0° after 6 hours, and 39.0° after 24 hours, as the time passed. The contact angle after 24 hours was still smaller than the original contact angle. This shows that the hydrophilic property was maintained for a long period of time.

Second Embodiment

First, in the same manner as for Coating agent A of the above-described embodiment 1, alcohol dispersed liquid containing 4 wt % of titania nanosheets (TNS) was prepared. This liquid was diluted with ethanol so as to make alcohol dispersed liquid containing 1 wt % of titania nanosheets.

Subsequently, this alcohol dispersed liquid containing 1 wt % of titania nanosheets and tetraethoxysilane (TEOS), a binder, were mixed in accordance with the following compositions in the weight ratio so as to make the coating agents.

TNS/TEOS=100/0, 97.5/2.5, 95/5, 92.6/7.5, 90/10, 86/15, 80/20, 70/30, 60/40, 50/50, 40/60, 30/70, 20/80, 10/90, 0/100

It should be noted that, in the above-described ratio indication, TNS indicates the weight of titania nanosheets in the alcohol dispersed liquid containing 1 wt % of titania nanosheets, and TEOS indicates the weight of tetraethoxysilane.

The prepared coating agents were respectively applied on Pyrex (registered trademark) glass in the size of 50 mm×50 mm×thickness 3 mm by the spin coat method so as to form a film. Subsequently, firing was conducted at 100° C., 200° C., 300° C., 400° C., 600° C., 600° C., and 700° C. on those films formed by the coating agents with the ratio of TNS/TEOS 100/0, 97.5/2.5, 95/5, 92.5/7.5, 90/10, 85/15, 80/20, 70/30, 60/40, 50/60. On those films formed by the coating agents with the ratio of TNS/TEOS 40/60, 30/70, 20/80, 10/90, 0/100, firing was conducted at 100° C., 200° C., 300° C., and 400° C. The firing was carried out once for one hour by an electric furnace.

On each film, tests were conducted so as to evaluate the hardness, hydrophilic property, anti-staining, anti-fouling properties and ability to decompose fouling.

(i) Hardness Evaluation

On each film, hardness evaluation was conducted in accordance with the pencil scratch test as set forth in JIS K5400, The result is shown in Table 1. It should be noted that the ratio shown in "composition" columns in Table 1 and Table 2 to 5 to be described hereinafter are TNS/TEOS ratios described above.

TABLE 1

Pencil scratch test

| composition | firing temperature (° C.) | | | | | | |
|---|---|---|---|---|---|---|---|
| | 100 | 200 | 300 | 400 | 500 | 600 | 700 |
| 100/0 | <6B | <6B | F | >9H | >9H | >9H | >9H |
| 97.5/2.5 | <6B | <6B | 6B | 8H | >9H | >9H | >9H |
| 95/5 | <6B | <6B | F | >9H | >9H | >9H | >9H |
| 92.5/7.5 | <6B | <6B | 3B | >9H | >9H | >9H | >9H |
| 90/10 | <6B | <6B | 2B | >9H | >9H | >9H | >9H |
| 85/15 | <6B | <6B | 6H | >9H | >9H | >9H | >9H |
| 80/20 | <6B | <6B | F | >9H | >9H | >9H | >9H |
| 70/30 | <6B | <6B | 7H | >9H | >9H | >9H | >9H |
| 60/40 | <6B | <6B | 7H | >9H | >9H | >9H | >9H |
| 50/50 | <6B | <6B | 7H | >9H | >9H | >9H | >9H |
| 40/60 | <6B | 5B | >9H | >9H | | | |
| 30/70 | <6B | <6B | >9H | >9H | | | |
| 20/80 | <6B | <6B | >9H | >9H | | | |
| 10/90 | <6B | 5H | >9H | >9H | | | |

As shown in Table 1, the film hardness became equal to or harder than 9H which was the hardest, irrespective of the composition ratio of TNS and the binder when firing was conducted at or higher than 400° C. In these cases, the films became particularly hard.

(ii) Adhesiveness Evaluation

On each film, adhesiveness evaluation was conducted in accordance with the grid tape method as set forth in JIS K5400. The result is shown in Table 2.

TABLE 2

Adhesiveness test

| composition | firing temperature (° C.) | | | | | | |
|---|---|---|---|---|---|---|---|
| | 100 | 200 | 300 | 400 | 500 | 600 | 700 |
| 100/0 | 2 | 4 | 10 | 10 | 10 | 10 | 10 |
| 97.5/2.5 | 2 | 4 | 10 | 10 | 10 | 10 | 10 |
| 95/5 | 2 | 4 | 10 | 10 | 10 | 10 | 10 |
| 92.5/7.5 | 0 | 8 | 10 | 10 | 10 | 10 | 10 |
| 90/10 | 0 | 10 | 10 | 10 | 10 | 10 | 10 |
| 85/15 | 0 | 10 | 10 | 10 | 10 | 10 | 10 |
| 80/20 | 2 | 10 | 10 | 10 | 10 | 10 | 10 |
| 70/30 | 4 | 10 | 10 | 10 | 10 | 10 | 10 |
| 60/40 | 6 | 10 | 10 | 10 | 10 | 10 | 10 |
| 50/50 | 8 | 10 | 10 | 10 | 10 | 10 | 10 |
| 40/60 | 6 | 8 | 10 | 10 | | | |
| 30/70 | 6 | 8 | 10 | 10 | | | |
| 20/80 | 8 | 8 | 10 | 10 | | | |
| 10/90 | 8 | 10 | 10 | 10 | | | |

As shown in Table 2, the adhesiveness became particularly good irrespective of the composition ratio of TNS and the binder when the firing was conducted at or higher than 300° C.

(iii) Hydrophilic Property Evaluation

In order to evaluate the hydrophilic property of the films, on each film, the contact angle of water was measured after a 20 minutes exposure to the ultrahigh pressure mercury lamp. The result is shown in Table 3. The unit of a contact angle in Table 3 is degree.

TABLE 3

Contact angle

| composition | firing temperature (° C.) | | | | | | |
|---|---|---|---|---|---|---|---|
| | 100 | 200 | 300 | 400 | 500 | 600 | 700 |
| 100/0 | 17.3 | 9 | 0 | 0 | 0 | 0 | 0 |
| 97.5/2.5 | 28.4 | 8.4 | 0 | 0 | 0 | 0 | 0 |
| 95/5 | 19 | 9.6 | 0 | 0 | 0 | 0 | 0 |
| 92.5/7.5 | 17.8 | 7.6 | 0 | 0 | 0 | 0 | 0 |
| 90/10 | 20.3 | 7.5 | 0 | 0 | 0 | 0 | 0 |
| 85/15 | 28.4 | 6.7 | 0 | 0 | 0 | 0 | 0 |
| 80/20 | 26 | 7.4 | 5.6 | 0 | 0 | 0 | 0 |
| 70/30 | 24.2 | 6.7 | 5.1 | 0 | 0 | 0 | 0 |
| 60/40 | 21.3 | 4.4 | 5.6 | 0 | 0 | 0 | 0 |
| 50/50 | 31.6 | 4.8 | 0 | 0 | 0 | 0 | 0 |
| 40/60 | 17.6 | 0 | 0 | 0 | | | |
| 30/70 | 347.2 | 0 | 0 | 0 | | | |
| 20/80 | 22.3 | 0 | 0 | 0 | | | |
| 10/90 | 31.4 | 0 | 0 | 0 | | | |

As shown in Table 3, the surface became superhydrophilic wherein the contact angle is equal to or smaller than 10 degree, irrespective of the composition ratio of the TNS and the binder as a result of the firing at or higher than 200° C. Moreover, when the firing temperature was 300° C. or higher, the hydrophilic property was even better. Furthermore, when the firing temperature was 400° C. or higher, the hydrophilic property was even better.

(iv) Anti-staining and Anti-fouling Properties Evaluation

In order to evaluate the anti-staining and anti-fouling properties of the films, the following test was conducted on each film. That is, Pyrex (registered trademark) glass on which the film was formed, was immersed in 0.1 mM methylene blue (MB) aqueous solution overnight. After taking out the glass from the solution and washing the glass with pure water, the amount of MB adhered to the film was measured with the ultraviolet-visible spectrophotometer. The amount of adhered MB is indicated as the size of absorption area. The result of the measurement is shown in Table 4.

TABLE 4

Amount of methylene blue absorbed by immersion

| composition | firing temperature (° C.) | | | | | | |
|---|---|---|---|---|---|---|---|
| | 100 | 200 | 300 | 400 | 500 | 600 | 700 |
| 100/0 | 2.0 | 22.5 | 2.4 | 1.7 | 1.5 | 1.1 | 0.9 |
| 97.5/2.5 | 2.3 | 24.5 | 1.2 | 1.8 | 1.2 | 1.6 | 1.0 |
| 95/5 | 5.9 | 25.3 | 3.1 | 1.5 | 1.4 | 1.4 | 0.9 |
| 92.5/7.5 | 5.0 | 31.3 | 2.9 | 1.8 | 1.5 | 1.6 | 1.2 |
| 90/10 | 4.9 | 28.5 | 2.9 | 1.6 | 1.6 | 1.3 | 0.8 |
| 85/15 | 6.1 | 24.2 | 3.0 | 2.5 | 2.7 | 2.0 | 1.6 |
| 80/20 | 8.2 | 22.1 | 3.9 | 3.4 | 2.4 | 2.0 | 1.5 |
| 70/30 | 14.8 | 23.9 | 5.2 | 3.0 | 2.3 | 2.2 | 1.0 |
| 60/40 | 25.3 | 21.1 | 6.1 | 2.7 | 3.1 | 3.5 | 2.3 |
| 50/50 | 24.4 | 17.0 | 2.7 | 1.9 | 2.7 | 2.9 | 3.2 |
| 40/60 | 28.1 | 22.5 | 8.4 | 6.0 | | | |
| 30/70 | 23.7 | 18.2 | 7.9 | 6.0 | | | |
| 20/80 | 20.6 | 20.1 | 8.8 | 7.0 | | | |
| 10/90 | 18.8 | 19.4 | 9.2 | 7.1 | | | |

As shown in Table 4, the anti-staining and anti-fouling properties became high when the firing temperature was at or higher than 300° C. The amount of MB adhered on the film was approximately 2. The film obtained better property as a result of firing at higher temperature. When the ratio of the binder was low (for example, when the ratio of the binder is smaller than 90/10), the anti-staining and anti-fouling properties were even higher.

(v) Evaluation of Ability to Decompose Fouling

In order to evaluate the ability to decompose fouling of the films, the following test was conducted on each film. First, MB was adhered onto a film by immersing the film into 0.1 mM methylene blue (MB) aqueous solution overnight and washing the film with pure water after taking out the film from the solution. Subsequently, the film was exposed to the light from the ultrahigh pressure mercury lamp for 10 minutes. Then the residual amount of MB on the film was measured. The amount of adhered MB is indicated as the size of absorption area. The result is shown in Table 5.

TABLE 5

Decomposition rate of methylene blue by ultraviolet ray exposure

| composition | firing temperature (° C.) | | | | | | |
|---|---|---|---|---|---|---|---|
| | 100 | 200 | 300 | 400 | 500 | 600 | 700 |
| 100/0 | 0.69 | 0.83 | 0.89 | 0.84 | 0.88 | 0.79 | 0.62 |
| 97.5/2.5 | 0.73 | 0.83 | 0.68 | 0.97 | 0.86 | 0.82 | 0.79 |
| 95/5 | 0.70 | 0.85 | 0.86 | 0.92 | 0.80 | 0.84 | 0.81 |
| 92.5/7.5 | 0.54 | 0.85 | 0.81 | 0.95 | 0.91 | 0.90 | 0.85 |
| 90/10 | 0.52 | 0.85 | 0.79 | 0.91 | 0.86 | 0.78 | 0.83 |
| 85/15 | 0.53 | 0.83 | 0.78 | 0.94 | 0.93 | 0.90 | 0.99 |
| 80/20 | 0.65 | 0.84 | 0.77 | 0.97 | 0.93 | 0.89 | 0.92 |
| 70/30 | 0.62 | 0.84 | 0.65 | 0.78 | 0.92 | 0.92 | 0.65 |
| 60/40 | 0.72 | 0.83 | 0.47 | 0.94 | 0.94 | 0.95 | 0.91 |
| 50/50 | 0.73 | 0.81 | 0.87 | 1.00 | 0.95 | 0.92 | 0.94 |
| 40/60 | 0.64 | 0.66 | 0.51 | 0.57 | | | |
| 30/70 | 0.61 | 0.60 | 0.49 | 0.55 | | | |
| 20/80 | 0.64 | 0.64 | 0.50 | 0.51 | | | |
| 10/90 | 0.67 | 0.65 | 0.49 | 0.47 | | | |

As shown in Table 5, the ability to decompose fouling was particularly good when the firing temperature was between 200° C. and 600° C., and within the range of TNS/TEOS=100/0 to 50/50.

From the above results, it was confirmed that when the firing temperature is between 400° C. and 600° C. and TNS/TEOS=100/0 to 50/50, the hardness, adhesiveness, hydrophilic property, anti-staining, anti-fouling properties and ability to decompose fouling of a film were particularly good.

Third Embodiment

First, in the same manner as for Coating agent A of the above-described embodiment 1, alcohol dispersed solution containing 1 wt % titania nanosheets (TNS) was prepared. The solution was diluted with ethanol so as to make alcohol dispersed solution containing 0.25 wt % titania nanosheets.

Subsequently, the alcohol dispersed solution containing 0.25 wt % titania nanosheets and titanium tetraisopropoxide (TIPO), a binder were mixed together in accordance with the following compositions in the weight ratio so as to make coating agents.

TNS/TIPO=90/10, 80/20, 70/30, 60/40, 50/50, 40/60, 30/70, 20/80, 10/90

It should be noted that in the above ratio indication, TNS indicates the weight of titania nanosheets in the alcohol dispersed solution containing 0.25 wt % titania nanosheets, and IPO indicates the weight of titanium tetraisopropoxide.

The prepared coating agents were respectively applied on Pyrex (registered trademark) glass in the size of 50 mm×50 mm×thickness 3 mm. Firing was conducted at 100° C., 200° C., 300° C., 400° C., 500° C., and 600° C. so as to form a film.

The hardness, hydrophilic property, anti-staining, anti-fouling properties, ability to decompose fouling of the formed films were evaluated in the same manner as in the above-described embodiment 2. The result is shown in Tables 6 to 10. It should be noted that the ratio in the "composition" column is the ratio indication of TNS/TIPO.

TABLE 6

Pencil scratch test

| composition | firing temperature (° C.) | | | | | |
|---|---|---|---|---|---|---|
| | 100 | 200 | 300 | 400 | 500 | 600 |
| 90/10 | <6B | <6B | <6B | <6B | >9H | >9H |
| 80/20 | <6B | <6B | <6B | <6B | >9H | >9H |
| 70/30 | <6B | <6B | <6B | HB | >9H | >9H |
| 60/40 | <6B | <6B | 2B | >9H | >9H | >9H |
| 50/50 | <6B | <6B | >9H | >9H | >9H | >9H |
| 40/60 | <6B | <6B | >9H | >9H | >9H | >9H |
| 30/70 | 2B | 4B | >9H | >9H | >9H | >9H |
| 20/80 | 7H | B | >9H | >9H | >9H | >9H |
| 10/90 | <6B | 6B | >9H | >9H | >9H | >9H |

TABLE 7

Adhesiveness test

| composition | firing temperature (° C.) | | | | | |
|---|---|---|---|---|---|---|
| | 100 | 200 | 300 | 400 | 500 | 600 |
| 90/10 | 2 | 2 | 10 | 10 | 10 | 10 |
| 80/20 | 2 | 2 | 10 | 10 | 10 | 10 |
| 70/30 | 2 | 2 | 10 | 10 | 10 | 10 |
| 60/40 | 2 | 6 | 10 | 10 | 10 | 10 |
| 50/50 | 2 | 6 | 10 | 10 | 10 | 10 |
| 40/60 | 2 | 6 | 10 | 10 | 10 | 10 |
| 30/70 | 4 | 6 | 10 | 10 | 10 | 10 |
| 20/80 | 4 | 6 | 10 | 10 | 10 | 10 |
| 10/90 | 8 | 8 | 10 | 10 | 10 | 10 |

TABLE 8

Contact angle

| composition | firing temperature (° C.) | | | | | |
|---|---|---|---|---|---|---|
| | 100 | 200 | 300 | 400 | 500 | 600 |
| 90/10 | 19.3 | 18.2 | 8.6 | 0.0 | 7.2 | 9.0 |
| 80/20 | 19.1 | 14.2 | 5.8 | 0.0 | 5.6 | 7.6 |
| 70/30 | 17.1 | 16.0 | 5.3 | 7.8 | 8.0 | 8.0 |
| 60/40 | 14.4 | 7.2 | 5.2 | 7.2 | 7.2 | 8.2 |
| 50/50 | 13.4 | 9.2 | 6.5 | 6.4 | 0.0 | 8.8 |
| 40/60 | 12.8 | 11.4 | 0.0 | 5.2 | 6.7 | 6.2 |
| 30/70 | 9.9 | 10.2 | 6.4 | 7.4 | 6.8 | 6 |
| 20/80 | 10.1 | 11.2 | 7.3 | 4.8 | 7.2 | 8.7 |
| 10/90 | 9.5 | 10.4 | 7.1 | 7.9 | 6 | 5.4 |

TABLE 9

Amount of methylene blue absorbed by immersion

| composition | firing temperature (° C.) | | | | | |
|---|---|---|---|---|---|---|
| | 100 | 200 | 300 | 400 | 500 | 600 |
| 90/10 | 8.5 | 5.6 | 1.8 | 2.1 | 1.1 | 0.9 |
| 80/20 | 8.5 | 11.2 | 2.0 | 3.4 | 1.6 | 1.2 |
| 70/30 | 8.1 | 9.2 | 2.3 | 2.1 | 1.8 | 1.0 |
| 60/40 | 3.8 | 16.1 | 1.4 | 1.8 | 0.7 | 0.4 |
| 50/50 | 3.2 | 17.1 | 1.6 | 1.1 | 1.1 | 0.7 |
| 40/60 | 5.8 | 17.8 | 2.7 | 1.0 | 1.1 | 0.8 |
| 30/70 | 18.3 | 15.9 | 2.2 | 1.6 | 1.2 | 0.7 |

TABLE 9-continued

Amount of methylene blue absorbed by immersion

| | firing temperature (° C.) | | | | | |
|---|---|---|---|---|---|---|
| composition | 100 | 200 | 300 | 400 | 500 | 600 |
| 20/80 | 17.2 | 14.3 | 2.3 | 1.9 | 1.0 | 0.8 |
| 10/90 | 18.9 | 15.8 | 3.1 | 1.9 | 0.8 | 0.5 |

TABLE 10

Decomposition rate of methylene blue by ultraviolet ray exposure

| | firing temperature (° C.) | | | | | |
|---|---|---|---|---|---|---|
| composition | 100 | 200 | 300 | 400 | 500 | 600 |
| 90/10 | 0.69 | 0.24 | 0.68 | 0.80 | 0.85 | 0.86 |
| 80/20 | 0.46 | 0.56 | 0.61 | 0.63 | 0.88 | 0.88 |
| 70/30 | 0.46 | 0.49 | 0.68 | 0.72 | 0.72 | 0.61 |
| 60/40 | 0.49 | 0.55 | 0.80 | 0.87 | 0.89 | 0.88 |
| 50/50 | 0.54 | 0.42 | 0.68 | 0.78 | 0.78 | 0.65 |
| 40/60 | 0.31 | 0.44 | 0.83 | 0.89 | 0.61 | 0.57 |
| 30/70 | 0.32 | 0.40 | 0.85 | 0.77 | 0.62 | 0.29 |
| 20/80 | 0.33 | 0.24 | 0.99 | 0.83 | 0.80 | 0.71 |
| 10/90 | 0.31 | 0.41 | 0.89 | 0.84 | 0.72 | 0.88 |

As shown in aforementioned Table 6, the film hardness improved as the ratio of the binder increased. Moreover, higher firing temperature resulted with higher hardness. When TNS/TIPO was 90/10, 80/20, 70/30, and 60/40, the hardness became the highest, 9H or higher at the firing temperature of 500° C. or higher. When TNS/TIPO was 50/50, 40/60, 30/170, 20/80, and 10/90, the hardness became the highest, 9H or harder at the firing temperature of 300° C. or higher.

As shown in aforementioned Table 7, the adhesiveness became better by the firing at 300° C. or higher irrespective of the composition ratio of the TNS and the binder.

As shown in aforementioned Table 8, the hydrophilic property became superhydrophilic wherein the contact angle is 10 degree or smaller by firing at 300° C. or higher irrespective of the composition ratio of TNS and the binder.

As shown in aforementioned Table 9, the anti-staining and anti-fouling properties were particularly good, wherein the amount of adhered MB was approximately 2, when the firing temperature was at or higher than 300° C. Firing at higher temperature made the film better in the anti-staining and anti-fouling properties. Even when the binder ratio was increased, the anti-staining and anti-fouling properties were not reduced.

As shown in aforementioned Table 10, the ability to decompose fouling was particularly good when the firing temperature was at or higher than 300° C. irrespective of the composition ratio of the TNS and the binder.

From above results, it was confirmed that the hardness, adhesiveness, hydrophilic property, anti-staining, anti-fouling properties and ability to decompose fouling of a film which was formed by the coating agent with TIPO as a binder were particularly good when the firing temperature was between 300° C. and 600° C. and TNS/TIPO was 50/50 to 10/90, or when the firing temperature was between 500° C. and 600° C. and TNS/TIPO was 90/10 to 10/90.

Fourth Embodiment

First, in the same manner as for Coating agent A of the above-described embodiment 1, alcohol dispersed solution containing 1 wt % titania nanosheets (TNS) was prepared.

Additionally, alcohol dispersed solution containing spherical titanium oxide powder at the concentration of 1 wt % (product name: ST-01, manufactured by Ishihara Sangyo Kaisha, Ltd.) wherein the size of primary particles was 7 nm was also prepared. Among anatase, rutile and brookite, this ST-01 mainly contains anatase.

Subsequently, the alcohol dispersed solution of titania nanosheets and the alcohol dispersed solution of spherical titanium oxide powder were mixed at the following volume ratios so as to make coating agents.

TNS/ST-01=90/10, 80/20, 70/30, 60/40, 50/50, 40/60, 30/70, 20/80, and 10/90

In addition to thin sheet microparticles of titanium oxide, the coating agents prepared as above contains microparticles of titanium oxide having other shapes (spherical).

It should be noted that, in the above ratio indication, TNS indicates the volume of the alcohol dispersed solution containing titania nanosheets, and ST-01 indicates the volume of the alcohol dispersed solution containing spherical titanium oxide.

The prepared coating agents were respectively applied on Pyrex (registered trademark) glass in the size of 50 mm×50 mm×thickness 3 mm. Firing was subsequently conducted at 200° C., 300° C., 400° C., 500° C., and 600° C. so as to form a film.

The hardness, hydrophilic property, anti-staining, anti-fouling properties, and ability to decompose fouling of formed films were evaluated in the same manner as in the above-described embodiment 2. The result is shown in Tables 11 to 14. It should be noted that the ratios in the "composition" columns are the above-described ratio indication of TNS/ST-01.

TABLE 11

Pencil scratch test

| | firing temperature (° C.) | | | | |
|---|---|---|---|---|---|
| composition | 200 | 300 | 400 | 500 | 600 |
| 90/10 | <6B | >9H | >9H | >9H | >9H |
| 80/20 | <6B | >9H | >9H | >9H | >9H |
| 70/30 | <6B | >9H | >9H | >9H | >9H |
| 60/40 | <6B | >9H | >9H | >9H | >9H |
| 50/50 | <6B | >9H | >9H | >9H | >9H |
| 40/60 | <6B | >9H | >9H | >9H | >9H |
| 30/70 | <6B | >9H | >9H | >9H | >9H |
| 20/80 | <6B | 7H | >9H | >9H | >9H |
| 10/90 | <6B | 7H | >9H | >9H | >9H |

TABLE 12

Contact angle

| | firing temperature (° C.) | | | | |
|---|---|---|---|---|---|
| composition | 200 | 300 | 400 | 500 | 600 |
| 90/10 | 12.0 | 0.0 | 0.0 | 0.0 | 0.0 |
| 80/20 | 6.6 | 5.9 | 0.0 | 0.0 | 8.0 |
| 70/30 | 0.0 | 11.2 | 5.6 | 0.0 | 0.0 |
| 60/40 | 6.6 | 8.8 | 5.7 | 0.0 | 0.0 |
| 50/50 | 0.0 | 8.5 | 0.0 | 7.3 | 6.4 |
| 40/60 | 0.0 | 0.0 | 0.0 | 0 | 0 |
| 30/70 | 6.2 | 6.0 | 5.6 | 5.6 | 0 |
| 20/80 | 0.0 | 0.0 | 0.0 | 0 | 0 |
| 10/90 | 0.0 | 0.0 | 0.0 | 0 | 0 |

TABLE 13

Amount of methylene blue absorbed by immersion

| composition | firing temperature (° C.) | | | | |
| --- | --- | --- | --- | --- | --- |
|  | 200 | 300 | 400 | 500 | 600 |
| 90/10 | 2.7 | 2.4 | 2.2 | 1.4 | 1.6 |
| 80/20 | 2.1 | 1.8 | 1.8 | 1.4 | 1.6 |
| 70/30 | 2.5 | 2.3 | 1.5 | 1.4 | 2.4 |
| 60/40 | 2.1 | 1.9 | 2.1 | 1.7 | 1.8 |
| 50/50 | 3.1 | 2.1 | 2.1 | 1.7 | 1.8 |
| 40/60 | 2.3 | 2.2 | 1.8 | 1.5 | 1.8 |
| 30/70 | 2.4 | 2.3 | 1.8 | 1.7 | 1.9 |
| 20/80 | 2.3 | 2.0 | 2.0 | 1.9 | 2.1 |
| 10/90 | 2.4 | 2.1 | 2.2 | 2.3 | 2.7 |

TABLE 14

Decomposition rate of methylene blue by ultraviolet ray exposure

| composition | firing temperature (° C.) | | | | |
| --- | --- | --- | --- | --- | --- |
|  | 200 | 300 | 400 | 500 | 600 |
| 90/10 | 0.62 | 0.74 | 0.86 | 0.86 | 0.82 |
| 80/20 | 0.87 | 0.94 | 0.87 | 0.85 | 0.86 |
| 70/30 | 0.71 | 0.75 | 0.81 | 0.90 | 0.85 |
| 60/40 | 0.76 | 0.77 | 0.80 | 0.87 | 0.89 |
| 50/50 | 0.72 | 0.87 | 0.90 | 0.84 | 0.80 |
| 40/60 | 0.70 | 0.86 | 0.83 | 0.89 | 0.80 |
| 30/70 | 0.66 | 0.79 | 0.84 | 0.81 | 0.75 |
| 20/80 | 0.68 | 0.75 | 0.79 | 0.81 | 0.78 |
| 10/90 | 0.69 | 0.80 | 0.84 | 0.84 | 0.77 |

As shown in aforementioned Table 11, in regard to the films formed when TNS/ST-01 was 90/10, 80/20, 70/30, 60/40, 50/50, 40/60, and 30/70, the highest film hardness, 9H or harder, was attained by the firing temperature of 300° C. or higher. Moreover, the films formed when was 20/80, and 10/90, the highest film hardness, 9H or harder, was attained by the firing temperature of 400° C. or higher.

As shown in aforementioned Table 12, the hydrophilic property of the film become superhydrophilic, wherein the contact angle is 10 degree or smaller, by firing at or higher than 200° C. irrespective of the composition of TNS/ST-01.

As shown in aforementioned Table 13, the anti-staining and anti-fouling properties were even better, wherein the amount of adhered MB was approximately 2, when the firing temperature was at or higher than 300° C. Firing at higher temperature made the films better in the anti-staining and anti-fouling properties.

As shown in aforementioned Table 14, the ability to decompose fouling of the film was particularly good when the firing temperature was at or higher than 300° C. irrespective of the composition ratio of TNS/ST-01.

From the above results, it was confirmed that, in case of coating agents containing titania nanosheets and spherical titanium oxide powder, the hardness, hydrophilic property, anti-staining, anti-fouling properties, and ability to decompose fouling were particularly good when the firing temperature was between 300° C. and 600° C.

Since the coating agents of the present embodiment 4 contains spherical titanium oxide powder, even coating agents, wherein the mixing ratio of the binder is low, can achieve the pencil scratch hardness of 9H at the low firing temperature of 300° C. Thus, it is possible with the coating agents of the present embodiment 4 to reduce the mixing ratio of the binder while maintaining the high hardness. In such case, it is possible to increase the anti-staining, anti-fouling properties and ability to decompose fouling to A higher degree.

Moreover, since spherical titanium oxide also has the photocatalytic function, the coating agents of the present embodiment 4 can achieve high photocatalytic activity (superhydrophilic property, capability of oxidized decomposition) even when the ratio of the titania nanosheets is low.

Fifth Embodiment

The smoothness of the films formed in the above-described embodiment 1 was evaluated with AFM. For the measurement apparatus of the evaluation, model SPA 300 manufactured by SII Nano Technology Inc. was used. The measurement condition was set in the tapping mode. The roughness Ra of the surface of the film formed in the above-described embodiment 1 was 0.4 nm. On the other hand, the roughness of the glass surface prior to the formation of the film was 0.2 to 0.3 nm. Therefore, it was confirmed that the smoothness was not lost even the coating agent was applied and a film was formed.

Sixth Embodiment

First, in the same manner as for Coating agent A of the above-described embodiment 1, alcohol dispersed solution containing 1 wt % titania nanosheets (TNS) was prepared, and then diluted with ethanol so as to make alcohol dispersed solution containing 0.25 wt % titania nanosheets. This alcohol dispersed solution was applied on the surface of a high reflective aluminum mirror (manufactured by Material House Co., Ltd.). Then, firing was conducted at each temperature indicated in Table 15 which is to be described hereinafter. Subsequently, the reflectance of the part on which the alcohol dispersed solution was applied was measured in the regular reflection with the incidence angle of 5° by the ultraviolet-visible spectrophotometer. The reflectance standard was the reflectance of the evaporated aluminum film attached to the ultraviolet-visible spectrophotometer. The results of the measurements are shown in Table 15.

TABLE 15

Reflectance

| Sample | Firing temperature (° C.) | Reflectance (%) |
| --- | --- | --- |
| aluminum surface | room temperature | 97.8 |
| aluminum surface | 500 | 75.2 |
| TNS coating | 200 | 98.9 |
| TNS coating | 300 | 100.2 |
| TNS coating | 350 | 97.5 |
| TNS coating | 400 | 100.0 |
| TNS coating | 500 | 88.4 |

As shown in Table 15, it was confirmed that the reflectance of the original base material was not lost even when a film was formed by applying the alcohol dispersed solution containing the titania nanosheets. Moreover, it was also confirmed that although the reflectance of the base material decreased when firing was conducted at 500° C., the reduction in the reflectance could be inhibited by applying the alcohol dispersed solution containing the titania nanosheets and by forming a film therewith.

Seventh Embodiment

First, in the same manner as for Coating agent A of the above-described embodiment 1, alcohol dispersed solution containing 1 wt % titania nanosheets (TNS) was prepared and diluted with ethanol so as to make alcohol dispersed solution containing 0.25 wt % titania nanosheets. This alcohol dispersed solution and tetraethoxysilane (TEOS), a binder were mixed in accordance with the following composition in the weight ratio so as to make coating agents.

TNS/TEOS-10010, 90/10, 80/20, 70/30, 60/40, 40/60, 30/70, 20/80, and 10/90

It should be noted that in the above-shown ratio indication, TNS indicates the weight of titania nanosheets in the alcohol dispersed solution containing 0.25 wt % titania nanosheets, and TEOS indicates the weight of tetraethoxysilane.

The prepared coating agents were respectively applied on Pyrex (registered trademark) glass in the size of 50 mm×50 mm×thickness 3 mm by the spin coat method. Subsequently, firing was conducted at 400° C. so as to form a film. The transmittance of the portion on the glass wherein the film was formed was measured with the ultraviolet-visible spectrophotometer. The results are shown in Table 16.

TABLE 16

Transmittance

| Composition | Transmittance (%) |
|---|---|
| 100/0 | 96.2 |
| 90/10 | 96.4 |
| 80/70 | 98.1 |
| 60/40 | 96.7 |
| 40/60 | 95.1 |
| 30/70 | 97.0 |
| 20/80 | 95.3 |
| 10/90 | 99.5 |

The transmittance indicated above is the average of the transmittance of the light in the visible light area (400 to 800 nm) in regard to the base material. As shown in Table 16, it was confirmed that the average transmittance is 96.8%, and that the transmittance hardly decreases even when a coating agent was applied and the film is formed. The above-mentioned "average transmittance" means the average value of the transmittance shown in Table 16.

COMPARATIVE EXAMPLE 2

Uncoated Pyrex (registered trademark) glass in the size of 50 mm×50 mm×thickness 3 mm was immersed into 0.1 mM MB aqueous solution overnight and cleansed with distilled water. The amount of MB initially adhered was 2.1. This amount is comparable or more than the amount adhered to the base plate on which 1 wt % titania nanosheets coating was applied. Therefore, by comparing with this comparative example 2, it was confirmed that the films formed by applying the coating agents in the above-described embodiments 2 to 4 either do not reduce the anti-staining and anti-fouling properties of the original base material or improve the anti-staining and anti-fouling properties.

COMPARATIVE EXAMPLE 3

On Pyrex (registered trademark) glass in the size of 50 mm×50 mm×thickness 3 mm, commercially available coating agent (product name: Bistrator NRC-360L, manufactured by Nippon Soda Co., Ltd.) containing spherical titanium oxide was applied. Coating was conducted in accordance with the specified method: coating for the basecoat layer and the photocatalytic layer by dip-coating, and drying at room temperature. Subsequently, the glass was immersed into 0.1 mM MB aqueous solution overnight, and washed with distilled water. The amount of MB initially adhered was 63.5. Moreover, the decomposition rate of MB after 10 minutes exposure to the ultraviolet light was 0.70. Therefore, it was confirmed that commercially available photocatalytic coating agents reduce the anti-staining and anti-fouling properties of the original base materials.

COMPARATIVE EXAMPLE 4

On Pyrex (registered trademark) glass in the size of 50 mm×50 mm×thickness 3 mm, commercially available coating agent (product name: ST-K211, manufactured by Ishihara Sangyo Kaisha, Ltd.) containing spherical titanium oxide was applied by dip-coating. Subsequently, firing was conducted at each temperature indicated in Table 17 to be described hereinafter so as to form a film.

A performance test in relation to the film hardness, anti-staining and anti-fouling properties of the formed film was conducted in the same manner as in the above-described embodiment 2. The result is shown in Tables 17 to 19.

TABLE 17

Pencil scratch test

| Sample | Pencil hardness |
|---|---|
| ST-K211 - rt - dip | 3H |
| ST-K211 - 100° C. - dip | 5H |
| ST-K211 - 300° C. - dip | 8H |
| ST-K211 - 400° C. - dip | >9H |
| ST-K211 - 500° C. - dip | >9H |

TABLE 18

Amount of methylene blue absorbed by immersion

| | Firing temperature (° C.) | | | | |
|---|---|---|---|---|---|
| | room temperature | 100 | 300 | 400 | 500 |
| Adhered amount | 3.0 | 3.1 | 3.6 | 5.2 | 4.3 |

TABLE 19

Summery of properties

| Sample | Film hardness | Anti-staining and anti-fouling properties |
|---|---|---|
| ST-K211 (firing at rt to 100° C.) | Δ | ○ |
| ST-K211 (firing at 300° C. to 500° C.) | ◎ | Δ |

As shown in the above Table 17, the condition wherein the film hardness becomes the highest, 9H or harder, was when the firing was conducted at or higher than 500° C.

As shown in the above Table 18, the anti-staining and anti-fouling properties show 3 or higher in all the conditions. The films formed in the test were easy to be stained compared to the result of the above-described embodiments 2 to 4.

Therefore, as shown in the above Table 19, for the coating agent of the present comparative example 4, no condition exists to satisfy both of the film hardness and the anti-staining and anti-fouling properties.

COMPARATIVE EXAMPLE 5

The smoothness of the film formed by the above-described comparative example 3 was evaluated in the same manner as in the above-described embodiment 5. The roughness Ra of the surface of the film formed in the above-described comparative example 3 was 3.5 nm. Compared to this value, the roughness of the surface of the glass prior to forming a film thereon was 0.2 to 0.3 nm. Consequently, it was confirmed that the smoothness of a base material was reduced when a film was formed by applying the coating agent of the above-described comparative example 3.

It should be noted that the present invention is not limited to the above-described embodiments and may be embodied in various ways without departing from the scope of the present invention.

For example, in the above-described embodiment 1, it is possible to prepare a coating agent so that the ratio of Si and Ti contained in Coating agent B becomes Si:Ti=2:8 to 0:10 by changing the mixing ratio of the sol solution of silicon oxide and Coating agent A. Even in this case, the film formed by Coating agent B has equivalent effect in the anti-staining, anti-fouling properties, self-cleaning property and the like.

Moreover, in the above-described embodiments 1 to 7, by using metal, semiconductors, carbon materials, nitride or carbide for the base materials, metal products, semiconductor products, carbon material products, nitride products, or carbide products may be manufactured.

Additionally, in the above-described embodiment 4, titanium oxide for mixing that it in the shapes other than the thin sheet shape may be any of the titanium oxide among anatase, rutile, and brookite. Furthermore, the titanium oxide may be a composite of two or more types of titanium oxide selected from the above-mentioned three types.

What is claimed is:

1. A coating agent comprising thin sheet microparticles of titanium oxide having a size in the range of 0.1 to 10 micrometers ($\mu$m) and a thickness in the range of 0.5 to 1 nanometer (nm) and a material selected from the group consisting of: (a) titanium oxide sol prepared from titanium tetra alkoxide, (b) aluminum oxide sol prepared from aluminum alkoxide, and (c) microparticles of titanium oxide in a shape other than a thin sheet shape.

2. The coating agent as set forth in claim 1 wherein the material comprises microparticles of titanium oxide in a shape other than the thin sheet shape that are microparticles of titanium oxide selected from a group consisting of anatase, rutile and brookite.

3. The coating agent as set forth in claim 1 wherein roughness of a surface of a film formed by applying the coating agent on a base material is in a range of 1 to 2 times a roughness of a surface of the base material.

4. The coating agent as set forth in claim 1 wherein hardness of the film formed by applying the coating agent is determined from the thin sheet microparticles of titanium oxide.

5. The coating agent as set forth in claim 1, wherein reflectivity of the film formed by applying the coating agent on a base material is in a range of 90 to 120% of reflectivity of the base material.

6. The coating agent as set forth in claim 1 wherein transmittance of the film formed by applying the coating agent on a transparent base material is in a range of 90 to 100% of transmittance of the base material.

7. A film forming method comprising steps of:
applying the coating agent as set forth in claim 1; and
drying the applied coating agent.

8. The film forming method as set forth in claim 7, wherein heating is conducted in the drying step.

9. A film that is formed in accordance with the film forming method as set forth in claim 7.

10. The film as set forth in claim 9 comprising a microstructure wherein the thin sheet microparticles of titanium oxide are layered in a uniform orientation.

11. A glass product comprising a base material made of glass and the film as set forth in claim 9 formed on a surface of the base material.

12. A metal product comprising a base material made of metal and the film as set forth in claim 9 formed on a surface of the base material.

13. A ceramic product comprising a base material made of ceramic and the film as set forth in claim 9 formed on a surface of the base material.

14. A heat-resistant polymer product comprising a base material made of heat-resistant polymer material and the film as set forth in claim 9 formed on a surface of the base material.

15. A titanium oxide film made of a coating agent, including titania nanosheets having a size in the range of 0.1 to 10 micrometers ($\mu$m) and a thickness in the range of 0.5 to 1 nanometer (nm) and tetraethoxysilane in a weight ratio of 100/0 to 50/50, by calcining the coating agent at 400° C. to 600° C.

16. A titanium oxide film made of a coating agent, including titania nanosheets having a size in the range of 0.1 to 10 micrometers ($\mu$m) and a thickness in the range of 0.5 to 1 nanometer (nm) and titanium tetraisopropoxide in a weight ratio of 50/50 to 10/90, by calcining the coating agent at 300° C. to 600° C.

17. A titanium oxide film made of a coating agent, including titania nanosheets having a size in the range of 0.1 to 10 micrometers ($\mu$m) and a thickness in the range of 0.5 to 1 nanometer (nm) and titanium tetraisopropoxide in a weight ratio of 90/10 to 10/90, by calcining the coating agent at 500° C. to 600° C.

18. A titanium oxide film made of a coating agent, including titania nanosheets having a size in the range of 0.1 to 10 micrometers ($\mu$m) and a thickness in the range of 0.5 to 1 nanometer (nm) and spherical titanium oxide powder, by calcining the coating agent at 300° C. to 600° C.

19. A coating agent comprising thin sheet microparticles of titanium oxide and microparticles of titanium oxide in a shape other than the thin sheet shape, wherein a ratio of the thin sheet microparticles of titanium oxide to microparticles of titanium oxide other than the thin sheet shape is 99/1 to 10/90, and a thickness of the thin sheet microparticles of titanium oxide is in the range of 0.5 to 1 nanometers (nm).

20. The coating agent according to claim 19, wherein the ratio of the thin sheet microparticles of titanium oxide to microparticles of titanium oxide other than the thin sheet shape is 90/10 to 10/90.

21. A coating agent comprising both thin sheet microparticles of titanium oxide and microparticles of titanium oxide in a shape other than the thin sheet shape, and aluminum oxide sol prepared from aluminum alkoxide, wherein a ratio of the thin sheet microparticles of titanium oxide to the microparticles of titanium oxide other than the thin sheet shape is 99/1 to 10/90, and a thickness of the thin sheet microparticles of titanium oxide is in the range of 0.5 to 1 nanometers (nm).

22. A coating agent comprising both thin sheet microparticles of titanium oxide and microparticles of titanium oxide in a shape other than the thin sheet shape, and titanium oxide sol prepared from titanium tetra alkoxide, wherein a ratio of the thin sheet microparticles of titanium oxide to microparticles of titanium oxide other than the thin sheet shape is 99/1 to 10/90, and a thickness of the thin sheet microparticles of titanium oxide is in the range of 0.5 to 1 nanometer (nm).

* * * * *

UNITED STATES PATENT AND TRADEMARK OFFICE
CERTIFICATE OF CORRECTION

PATENT NO.         : 8,048,511 B2
APPLICATION NO.    : 11/885918
DATED              : November 1, 2011
INVENTOR(S)        : Hiroshi Uetsuka et al.

It is certified that error appears in the above-identified patent and that said Letters Patent is hereby corrected as shown below:

Col. 1, Line 27
  Delete "agent."

Col. 1, Line 33
  Insert --or hydrolyzing aluminum alkoxide, such as AI(OC3H7)3-- before "is used as a..."

Col. 1, Line 55
  Delete "2968440"
  Insert --2958440--

Col. 4, Line 17
  Delete "lees"
  Insert --less--

Col. 9, Line 20
  Delete "game"
  Insert --same--

Col. 12, Line 39
  Delete "92.6"
  Insert --92.5--

Col. 12, Line 39
  Delete "86"
  Insert --85--

Col. 12, Line 50
  Delete the first instance of "600"
  Insert --500--

Signed and Sealed this
Fifth Day of March, 2013

Teresa Stanek Rea
*Acting Director of the United States Patent and Trademark Office*

CERTIFICATE OF CORRECTION (continued)
U.S. Pat. No. 8,048,511 B2

Col. 12, Line 53
　Delete "60"
　Insert --50--

Col. 12, Line 63
　Delete ","
　Insert --.--

Col. 17, Line 33
　Delete "30/170"
　Insert --30/70--

Col. 19, Line 38
　Insert --TNS/ST-01-- after "when"

Col. 20, Line 2
　Delete "A"
　Insert --a--

Col. 21, Line 7
　Delete "10010"
　Insert --100/0--

Col. 22, Line 2
　Delete "63.5"
　Insert --53.5--

Col. 23, Line 29
　Delete "it"
　Insert --is--